(12) United States Patent
Boualleg et al.

(10) Patent No.: US 11,554,358 B2
(45) Date of Patent: Jan. 17, 2023

(54) PROCESS FOR PREPARING AN ADSORBENT MATERIAL AND PROCESS FOR EXTRACTING LITHIUM USING SAID MATERIAL

(71) Applicants: ERAMET, Paris (FR); IFP ENERGIES NOUVELLES, Rueil-Malmaison (FR)

(72) Inventors: Malika Boualleg, Villeurbanne (FR); Fabien Burdet, Plaisir (FR); Yohan Florent Oudart, Versailles (FR)

(73) Assignees: ERAMET, Paris (FR); IFP ENERGIES NOUVELLES, Rueil-Malmaison (FR)

( * ) Notice: Subject to any disclaimer, the term of this patent is extended or adjusted under 35 U.S.C. 154(b) by 216 days.

(21) Appl. No.: 16/303,981

(22) PCT Filed: May 23, 2017

(86) PCT No.: PCT/EP2017/062371
§ 371 (c)(1),
(2) Date: Nov. 21, 2018

(87) PCT Pub. No.: WO2017/202825
PCT Pub. Date: Nov. 30, 2017

(65) Prior Publication Data
US 2020/0316557 A1    Oct. 8, 2020

(30) Foreign Application Priority Data

May 25, 2016  (FR) ..................... 16 54703

(51) Int. Cl.
| | | |
|---|---|---|
| *B01J 20/04* | (2006.01) | |
| *C01F 7/00* | (2022.01) | |
| *B01J 20/30* | (2006.01) | |
| *B01J 20/28* | (2006.01) | |
| *B01J 20/282* | (2006.01) | |
| *C01D 15/04* | (2006.01) | |
| *B01D 15/20* | (2006.01) | |
| *C01F 7/78* | (2022.01) | |

(52) U.S. Cl.
CPC .......... *B01J 20/046* (2013.01); *B01D 15/206* (2013.01); *B01J 20/282* (2013.01); *B01J 20/28052* (2013.01); *B01J 20/3007* (2013.01); *B01J 20/3085* (2013.01); *C01D 15/04* (2013.01); *C01F 7/78* (2022.01); *B01J 2220/52* (2013.01); *C01P 2002/72* (2013.01)

(58) Field of Classification Search
CPC combination set(s) only.
See application file for complete search history.

(56) References Cited

U.S. PATENT DOCUMENTS

| | | | |
|---|---|---|---|
| 4,348,297 A | 9/1982 | Bauman et al. | |
| 5,599,516 A * | 2/1997 | Bauman | C01D 15/04 252/184 |
| 6,280,693 B1 | 8/2001 | Bauman et al. | |
| 8,753,594 B1 * | 6/2014 | Burba, III | B01J 20/261 423/179.5 |
| 2011/0311419 A1 * | 12/2011 | Geniesse | C02F 1/5236 423/119 |
| 2014/0102946 A1 * | 4/2014 | Harrison | B01J 20/08 209/3 |
| 2016/0317998 A1 | 11/2016 | Boualleg et al. | |
| 2017/0043317 A1 | 2/2017 | Boualleg et al. | |

FOREIGN PATENT DOCUMENTS

| | | | |
|---|---|---|---|
| CL | 201601601 | | 12/2016 |
| CL | 201602663 | | 1/2017 |
| CN | 1243112 | | 2/2000 |
| CN | 1511964 A | * | 7/2004 |
| EP | 0103034 | | 3/1984 |
| FR | 3015458 | | 6/2015 |
| RU | 2234367 | | 8/2004 |
| WO | WO-2015097205 | | 7/2015 |
| WO | WO-2016193439 | | 12/2016 |

OTHER PUBLICATIONS

Moshe Frenkel et al: "Crystal modification of freshly precipitated aluminum hydroxide by lithium ion intercalation 11" Journal of Physical Chemistry, vol. 84, No. 5, Mar. 1, 1980 (Mar. 1, 1980), pp. 507-510, XP055330270, US ISSN: 0022-3654, DOI: 10.1021/j100442a010 p. 507-p. 509; figure 2■• tables I , I I.

Patrick Euzen et al: "Alumina" In: "Handbook of Porous solids", Apr. 25, 2008 (Apr. 25, 2008), Wiley-VCH Verlag GmbH, XP055057945, ISBN: 978-3-52-761828-6 pp. 1591-1677, DOI: 10.10002/9783527618286.

International Serach Report for PCT/EP2017/062371, dated Jul. 17, 2017.

(Continued)

*Primary Examiner* — Ngoc-Yen Nguyen
(74) *Attorney, Agent, or Firm* — B. Aaron Schulman, Esq.; Stites & Harbison, PLLC

(57) ABSTRACT

The present invention relates to the field of solid materials for the adsorption of lithium. In particular, the present invention relates to a novel process for preparing a solid crystalline material formed preferably in extrudate form, of formula $(LiCl)_x \cdot 2Al(OH)_3 \cdot nH_2O$ with n being between 0.01 and 10, x being between 0.4 and 1, comprising a step a) to precipitate boehmite under specific conditions of temperature and pH, a step to place the precipitate obtained in contact with a specific quantity of LiCl, at least one forming step preferably via extrusion, said process also comprising a final hydrothermal treatment step, all allowing an increase in lithium adsorption capacity and in the adsorption kinetics of the materials obtained compared to prior art materials, when used in a process to extract lithium from saline solutions.

10 Claims, 3 Drawing Sheets

OTHER PUBLICATIONS

Written Opinion of the International Seach Authority for PCT/EP2017/062371, dated Jul. 17, 2017.
Preliminary Search Report for FR 1654703, dated Dec. 20, 2016.

\* cited by examiner

PROCESS FOR PREPARING AN ADSORBENT MATERIAL AND PROCESS FOR EXTRACTING LITHIUM USING SAID MATERIAL

TECHNICAL FIELD

The present invention relates to the field of solid materials for the adsorption of lithium. In particular, the present invention relates to a novel process for preparing a solid crystalline material that is formed preferably in the form of extrudates having the formula $(LiCl)_x \cdot 2Al(OH)_3 \cdot nH_2O$ with n being between 0.01 and 10, x being between 0.4 and 1, comprising a step a) to precipitate boehmite under specific conditions of temperature and pH, a contacting step with lithium chloride below a stoichiometric amount, at least one forming step preferably via extrusion, all the characteristics of the process allowing an increase in the adsorption capacity of lithium and in the adsorption kinetics of the materials obtained compared with prior art materials, when applied in a process to extract lithium from saline solutions, and allowing the use of a smaller quantity of lithium chloride compared with processes in the prior art, thereby improving the production cost of the solid and reducing the amount of lithium lost in effluent.

The present invention also relates to a process for extracting lithium from saline materials using said solid crystalline material of formula $(LiCl)_x \cdot 2Al(OH)_3 \cdot nH_2O$ with n and x having the aforementioned definition, prepared according to the novel preparation process of the invention.

PRIOR ART

Lithium ions co-exist with massive amounts of metals such as alkali, alkaline-earth metals, boron and sulfates, in particular in saline solutions such as brine. The extraction thereof from these saline solutions must therefore be economical and selective. The chemical properties of lithium and alkali metals, preferably (Na), potassium (K), and of alkaline-earth metals preferably magnesium (Mg), calcium (Ca) and strontium (Sr), lead to difficult separation of these elements.

Solid materials of formula $LiCl \cdot 2Al(OH)_3 \cdot nH_2O$ with n being between 0.01 and 10 are known to be used for adsorption/desorption phenomena of lithium ions, and in particular in lithium extraction processes from saline solutions. These scarcely stable structures appear to allow intercalation of lithium atoms within the structure and hence the extraction of lithium.

Several operating protocols leading to solids able selectively to adsorb lithium have been evidenced in the prior art. In all cases, a prepared or commercial aluminium trihydroxide $Al(OH)_3$, is placed in contact with a lithium precursor. Three main precursors are employed: the most widely used is lithium chloride (LiCl). An aluminium hydroxide (LiOH) or lithium carbonate $Li_2CO_3$) can also be employed.

U.S. Pat. No. 6,280,693 describes a process for preparing a $LiCl/Al(OH)_3$ solid through the addition of an aqueous solution of LiOH to polycrystalline hydrated alumina to form $LiOH/Al(OH)_3$, and thereby create active lithium sites in the crystalline layers of alumina without altering the structure thereof. The conversion of $LiOH/Al(OH)_3$ to $LiCl/Al(OH)_3$ is then performed by adding dilute hydrochloric acid. The alumina pellets thus prepared are used in processes for extracting lithium from brine at high temperature. The lithium extraction process described in U.S. Pat. No. 6,280,693 uses the solid detailed above and comprises the following steps:

a) Saturating a bed of solid with brine containing a lithium salt LiX, X being selected from among halides, nitrates, sulfates and bicarbonates,
b) Displacing the impregnating brine using a concentrated NaX solution,
c) Eluting the LiC salt captured by the solid by passing a non-saturated LiX solution, d) Displacing the impregnating brine by using concentrated NaX, steps a) to d) are repeated at least once.

Patent RU 2 234 367 describes a process for preparing a solid of formula $LiCl \cdot 2Al(OH)_3 \cdot nH_2O$ comprising a step to mix aluminium trichloride ($AlCl_3$) and lithium carbonate ($Li_2CO_3$) in the presence of water at 40° C. The residue obtained is filtered, washed and dried for 4 hours at 60° C. The solid obtained is not subjected to forming.

The solid obtained is used to extract lithium contained in saline solutions by contacting with water to remove part of the lithium, followed by contacting with a lithium-containing saline solution. The static capacity obtained is between 6.0 and 8.0 mg of lithium per g of solid.

Patent CN1243112 describes a process for preparing a solid of formula $LiCl \cdot 2Al(OH)_3 \cdot nH_2O$ comprising a step to precipitate microcrystals of aluminium hydroxide $Al(OH)_3$ by contacting $AlCl_3$ with sodium hydroxide NaOH, and then contacting said microcrystals with 6% solution of lithium chloride at 80° C. for 2 hours followed by filtration, rinsing and drying to obtain a powder of $LiCl \cdot 2Al(OH)_3 \cdot nH_2O$ having a disordered amorphous structure. A solution of a macromolecular polymer selected from among fluorinated resins, polyvinyl chloride (PVC), chlorinated polyvinyl chloride (CPVC), ethylene perchlorate and cellulose acetate-butyrate (CAB) acting as binder is mixed with the powder of $LiCl \cdot 2Al(OH)_3 \cdot nH_2O$ to obtain a paste that is formed by granulation followed by drying in air.

The use of said solid in a process for extracting lithium from salt-lake brine allows a low Mg/Li ratio to be obtained and a lithium-rich mother liquor conforming to production standards for lithium carbonates or chlorides.

It is one objective of the present invention to provide a solid material allowing selective extraction of lithium from brine, said solid material being of good quality with no apparent defect and having good cohesion and good mechanical strength when placed in contact with a brine solution or water.

One objective of the present invention is to provide a novel process for preparing said solid material.

Another objective of the present invention is to provide a process for extracting lithium from saline solutions using a solid material.

A further objective of the present invention is to provide a solid material to implement a process for extracting lithium from saline solutions, whereby the solid material allows limited generation of fine particles, in particular since fine particles increase head loss promoting the creation of preferred pathways and increasing the renewal rate of the material when brine is passed through a bed of material within a column.

The applicants have discovered a novel process for preparing a solid crystalline material of formula $(LiCl)_x \cdot 2Al(OH)_3 \cdot nH_2O$ with n being between 0.01 and 10, x being between 0.4 and 1, comprising a combination of specific steps and particularly wherein the performing of step a) to precipitate boehmite under specific conditions of temperature and pH, the contacting with LiCl in small quantity followed by forming of the paste preferably via extrusion allow a solid crystalline material to be obtained of formula $(LiCl)_x.2Al(OH)_3.nH_2O$ with no apparent defect, having both good cohesion and good mechanical strength when placed in contact with a brine solution or water, and having improved lithium adsorption capacity and adsorption kinetics compared with prior art materials when used in a process to extract lithium from saline solutions.

Without wishing to be bound by any theory, the applicants have evidenced that the implementing of precipitation step a) under operating conditions of temperature and pH such as defined in the invention allows a boehmite precipitate to be obtained composed of small-size crystallites. In particular, the size of the boehmite precipitate obtained using the Scherrer X-ray diffraction formula along crystallographic directions [020] and [120], is between 0.5 and 10 nm and 0.5 and 15 nm respectively, preferably between 0.5 and 2 nm and 0.5 and 3 nm respectively, more preferably between 0.5 and 1.5 nm and 0.5 and 2.5 nm respectively.

The Scherrer formula is a formula used in X-ray diffraction on polycrystalline powders or samples, which relates the mid-height width of the diffraction peaks with the size of the crystallites. It is described in detail in the reference: Appl. Cryst. (1978). 11, 102-113 Scherrer after sixty years: A survey and some new results in the determination of crystallite size, J. I. Langford and A. J. C. Wilson.

The process of the invention comprising a precipitation step a) of the invention therefore allows a final solid crystalline material to be obtained of formula $(LiCl)_x.2Al(OH)_3.nH_2O$, with n between 0.01 and 10, x having the aforementioned definition that is also scarcely crystallized but having improved lithium adsorption capacity and adsorption kinetics compared with materials in the prior art when it is used in a process to extract lithium from saline solutions.

SUMMARY AND ADVANTAGE OF THE INVENTION

Preferably, by «material of formula $(LiCl)_x.2Al(OH)_3.nH_2O$» it is meant a material essentially comprising or consisting of a crystalline phase of formula $(LiCl)_x.2Al(OH)_3.nH_2O$, with n and x having the aforementioned definition.

The subject of the present invention is a process for preparing a solid crystalline material of formula $(LiCl)_x.2Al(OH)_3.nH_2O$ with n being between 0.01 and 10, x being between 0.4 and 1, said process comprising at least the following steps:
  a) a step to precipitate boehmite, in an aqueous medium, comprising the contacting of at least one base precursor preferably selected from among sodium aluminate, potassium aluminate, ammonia, sodium hydroxide, potassium hydroxide and any mixture thereof; with at least one acid precursor preferably selected from among aluminium chloride, hydrochloric acid and any mixture thereof, wherein at least one of the base or acid precursors comprises aluminium, to obtain a suspension of boehmite, said step a) being conducted at a temperature of between 5 and 35° C., and the amount of base precursor being selected so as to obtain an end-precipitation pH in the reaction medium of between 7.5 and 9.5;
  b) a step to wash and filter the boehmite precipitate obtained at step a);
  c) a step to contact the precipitate obtained at step b) with an amount of lithium chloride equivalent to a Li/Al molar ratio of between 0.3 and 1.2, preferably for a time of between 10 minutes and 12 hours;
  d) a step to filter the suspension obtained at step c) to obtain a paste;
  e) a step to dry the paste obtained after step d) at a temperature of between 20 and 80° C. preferably for a time of between 1 h and 12 h;
  f) a step to form said dried paste;
  g) a step to dry the formed material obtained after step f) at a temperature of between 20 and 200° C., preferably for a time of between 1 and 20 hours.

One advantage of the preparation process according to the invention is to allow a solid, crystalline material to be obtained that is formed preferably in extrudate form, of formula $(LiCl)_x.2Al(OH)_3.nH_2O$ with n and x having the aforementioned definition, of good quality, without no apparent defect and having good cohesion and improved mechanical strength when placed in contact with a brine solution or diluted solution and preferably in water.

Another advantage of the present invention is that of providing a process for preparing a solid crystalline material formed preferably in the form of extrudates, of formula $(LiCl)_x.2Al(OH)_3.nH_2O$ with n and x having the aforementioned definition, that has improved lithium adsorption capacity and improved adsorption kinetics compared with prior art materials when it is employed in a process for extracting lithium from saline solutions.

One other advantage of the present invention lies in the use of a smaller quantity of lithium chloride compared with prior art processes, which allows an improvement in the production cost of the solid and reduces the amount of lithium lost in effluent.

The adsorption capacity of the aforementioned material is defined by the amount of lithium adsorbed for a given solution. It is calculated by persons skilled in the art by integrating the quantity of attached lithium from the area under a breakthrough curve also called leak curve or saturation curve. Integration is determined on volume by the difference in lithium concentration between a solution after loading thereof onto the aforementioned material and the theoretical concentration without loading. This quantity of matter can be related to the quantity of material used to obtain a lithium capacity in milligrams per gram of solid.

The adsorption kinetics of the aforementioned material are measured by skilled persons by examining the shape of the breakthrough curve, also called leak curve or saturation curve. This curve is obtained by means of a column filled with the adsorbent material to form a homogeneous bed, then causing a lithium-containing saline solution to percolate, and measuring the lithium concentration at the outlet of the adsorbent bed as a function of the volume of solution used at a given flow rate.

By improved adsorption capacity compared with prior art materials is meant an adsorption capacity higher than 6 mg Li/g dry solid material.

By dry solid material is meant a solid material dried at 200° C. preferably for 12 hours.

By «formed» it is meant that the material is solid and has sufficient cohesion when the solid is placed in contact with a brine solution so that it does not substantially lose its physical integrity i.e. it substantially maintains its imparted shape. More specifically, a formed solid in the meaning of the invention covers a solid maintaining its cohesion under the lithium extraction conditions defined in the examples.

The cohesion and mechanical strength of the formed material, preferably via extrusion, prepared according to the invention, are tested when determining breakthrough curves, also called leak curves or saturation curves. A solid having good mechanical strength produces few or no fine particles and allows the column to be operated without observing any clogging. A solid having poor mechanical strength produces fine particles which lead to rapid fouling of the column.

The cohesion and mechanical strength of the formed material, preferably via extrusion, prepared according to the invention, are also tested using an accelerated ageing protocol on a shaker table, either in brine or in water.

The shaker table is given unidirectional, horizontal movement of 4 cm amplitude, at a rate of 190 movements per minute. The formed solids are shaken for a total time of 168 h.

After these 168 h, the mixture of formed solid/brine or water is sieved through a screen of mesh size 315 μm. The formed solids remaining on the sieve are washed with the medium used for shaking. The liquid fraction obtained, containing solid fine particles (diameter smaller than 315 μm) in suspension, is filtered with a Büchner fitted with filter paper having a pore size of 0.45 μm. The cake formed by agglomeration of the fine particles is washed with demineralized water. The solid residue obtained is oven dried at 50° C. until stabilization of the mass.

The ratio of the mass of solid residue to the mass of initial formed solids is calculated to give the percent destruction of the formed solids.

The percent destruction of the materials prepared according to the invention allows assessment of the cohesion of said materials.

Good cohesion is particularly obtained with materials having percent destruction lower than 60%, preferably lower than 50%, when they are placed in contact with a brine solution or any other diluted aqueous solution, in water in particular.

The materials prepared according to the invention also have improved mechanical strength compared with prior art materials.

By «improved mechanical strength» it is meant that the percent destruction of materials prepared according to the invention, when placed in contact with a brine solution or any other diluted aqueous solution and water in particular, is less than 30% and preferably less than 20%.

One other advantage of the preparation process of the invention is to allow the obtaining of a solid, crystalline material that is formed preferably via extrusion, of formula $(LiCl)_x.2Al(OH)_3,nH_2O$ with n and x having the aforementioned definition, having few or no cracks which could cause swelling detrimental to the cohesion and mechanical strength of the material, when it is placed in contact with a brine solution or diluted solution, preferably in water.

A further subject of the present invention is a process for extracting lithium from saline solutions using said formed, solid crystalline material of formula $(LiCl)_x.2Al(OH)_3, nH_2O$ with n being between 0.01 and 10, x being between 0.4 and 1, prepared with the novel preparation process of the invention. The increase in the capacity of the material compared with the prior art material allows less material to be employed to extract the same quantity of lithium from brine.

One advantage of the extraction process of the invention is to allow the selective extraction of lithium from a saline solution and thereby obtain a high purification factor in relation to the initial saline solution, calculated as being the ratio X/Li i.e. the molar ratio of X/Li concentrations in the initial saline solution divided by the molar ratio of X/Li concentrations in the final solution, X being selected from among sodium (Na), potassium (K), magnesium (Mg), calcium (Ca), boron (B), sulfur (S) and strontium (Sr). A further subject of the present invention is a solid crystalline material of formula $(LiCl)_x.2Al(OH)_3,nH_2O$ with n being between 0.01 and 10, x being between 0.4 and 1, preferably in the form of extrudates, able to be obtained with a process of the invention.

A further subject of the present invention is a device for extracting lithium from saline solution(s). The device of the invention therefore applies the extraction process of the invention.

DESCRIPTION OF THE INVENTION

Conforming to the invention, the process comprises a step a) to precipitate boehmite, in an aqueous reaction medium, said step comprising the contacting of at least one base precursor preferably selected from among sodium aluminate, potassium aluminate, ammonia, sodium hydroxide, potassium hydroxide and any of the mixtures thereof; with at least one acid precursor, aluminium trichloride ($AlCl_3$), hydrochloric acid and any of the mixtures thereof, wherein at least one of the base or acid precursors comprises aluminium, to obtain a suspension of boehmite, said step a) being conducted at a temperature of between 5 and 35° C., and the amount of base precursor being selected so as to obtain an end-precipitation pH in the reaction medium of between 7.5 and 9.5.

The mixing in the aqueous reaction medium of at least one base precursor and at least one acid precursor requires either that at least the base precursor or the acid precursor comprises aluminium, or that both the base and acid precursors comprise aluminium.

Preferably, the base precursor is sodium hydroxide (NaOH).

Preferably, the base and acid precursor(s) are added at said first precipitation step a) in aqueous solutions.

Preferably, the aqueous reaction medium is water.

Preferably, said step a) is performed under agitation.

Preferably, said boehmite precipitation step a) is conducted at a temperature of between 5 and 30° C., more preferably between 10 and 30° C. and further preferably at between 10 and 25° C., and the amount of base precursor being selected so as to obtain an end-precipitation pH in the reaction medium of between 7.5 and 9, more preferably between 7.7 and 8.8.

Preferably the precipitation step a) is conducted for a time of between 10 minutes and 5 hours, preferably between 15 minutes and 2 hours.

Said precipitation step a) allows a suspension of precipitated boehmite to be obtained or aluminium oxyhydroxide (AlOOH).

The performing of precipitation step a) under the operating conditions of temperature and pH such as defined allows a boehmite precipitate to be obtained having crystallites of small size. By crystallites of small size is meant a boehmite precipitate composed of crystallites the size of which, obtained with the Scherrer X-ray diffraction formula along crystallographic directions [020] and [120], is between 0.5 and 10 nm and 0.5 and 15 nm respectively, preferably between 0.5 and 2 nm and 0.5 and 3 nm respectively, more preferably between 0.5 and 1.5 nm and 0.5 and 2.5 nm respectively.

Conforming to the invention, the process comprises a step b) to wash and filter the boehmite precipitate obtained after step a).

Preferably, said wash step is a wash step in water.

Conforming to the invention, the process comprises a step to place the precipitate obtained at step b) in contact with a quantity of lithium chloride equivalent to a Li/Al molar ratio of between 0.3 and 1.2, preferably between 0.4 and 1, preferably for a time of between 10 minutes and 12 hours.

Preferably, the boehmite precipitate obtained at step b) and the lithium chloride are mixed in the presence of water to obtain a suspension at step c). Preferably, said mixing step c) is conducted under vigorous agitation.

Preferably, said contacting step c) is conducted at a temperature of between 20 and 95° C., more preferably between 50 and 95° C. and further preferably between 70 and 95° C.

Preferably the contacting step c) is conducted for a time of between 15 minutes and 12 hours, preferably between 15 minutes and 5 hours.

Conforming to the invention, the suspension obtained after step c) is subjected to a filtration step d) to obtain a paste.

Conforming to the invention, the paste obtained after step d) is dried at drying step e), preferably at a temperature of between 20 and 80° C., preferably for a time of between 1 h and 12 h.

Preferably, said drying step is conducted in a drying or heating oven at a temperature of between 20 and 60° C., more preferably at between 30 and 50° C., preferably for a time of between 1 h and 10 h.

The operating conditions at said drying step e) allow a dried paste to be obtained having a loss on ignition (LOI) of between 45 and 75%, preferably between 50 and 70%. The loss on ignition obtained allows the forming, preferably via extrusion, of the dried paste under good conditions and the obtaining of formed materials, preferably in the form of extrudates, that are resistant and without apparent defect i.e. without cracks.

To determine LOI before the forming step, a portion of the paste obtained is taken and placed in an oven for 6 h at 200° C. LOI is obtained by the difference between the mass of the sample before and after the time in the oven.

Conforming to the invention, said dried paste obtained after the drying step e) is subjected to a forming step f).

Preferably, said forming step f) is performed in accordance with methods known to skilled persons e.g. via extrusion, pelleting, oil-drop, turntable granulation.

Preferably, said forming step f) is performed via extrusion. Most preferably said step f) is performed via direct extrusion or knead-extrusion.

By direct forming of the dried paste derived from step e) is meant a step whereby said dried paste does not undergo any intermediate steps between the drying step e) and the placing thereof in the extruder, and in particular no kneading step By knead-extrusion is meant a step at which the dried paste obtained after the drying step e) undergoes a first kneading step with or without the presence of at least one binder or binder precursor compound, after which the paste is subjected to the extrusion step.

The knead-extrusion forming step e) is advantageously performed in manner known to those skilled in the art.

Preferably, said dried paste obtained after the drying step e), and optionally at least one said binder or binder precursor if any, are mixed preferably at once in a kneader. The kneader is advantageously selected from among batch kneaders, preferably with cam blades or Z blades, or else a twin-screw kneader-mixer. The kneading conditions are adjusted in manner known to skilled persons to obtain a homogeneous, extrudable paste. In knead-extrusion methods known to those skilled in the art, the extrudability of the paste can optionally and advantageously be adjusted through the addition of water and/or acid in solution to obtain a paste adapted for the conducting of forming step e) via extrusion. If an acid is added, a neutralization step is generally carried out. These methods are called acidic knead/basic extrusion.

According to a first embodiment of step f), said forming step f) can advantageously be implemented directly after the drying step e).

Preferably the direct forming step f) of the dried paste is performed in the absence of any binder selected from among inorganic binders e.g. hydraulic binders, or inorganic binders likely to be generated under the conditions of step e) through the addition of inorganic binder precursors and organic binders e.g. paraffins or polymers.

In this case, said dried paste is preferably not subjected to any intermediate step between said drying step e) and said forming step f) via extrusion, and preferably no kneading step and more preferably no acidic/basic kneading step. Therefore, most preferably said forming step f) according to the first embodiment is implemented without the addition of an acid or base to the dried paste used at step f).

Said forming step f) via direct extrusion is advantageously implemented in manner known to those skilled in the art.

In particular, the dried paste derived from drying step e) is advantageously passed through a die using a piston for example or a continuous twin-screw or single-screw extruder. The diameter of the die of the extruder is advantageously variable and is between 0.5 and 5 mm, preferably between 0.5 and 3 mm, more preferably between 0.5 and 2 mm. The shape of the die and therefore the shape of the extrudate form is advantageously cylindrical e.g. of circular, trilobate, quadrilobate or multilobate cross-section.

According to a second embodiment of step f), said forming step f) can advantageously be implemented by knead-extrusion in the presence of at least one binder selected from among organic or inorganic binders, and preferably without the addition of an acid or base to the dried paste used at said step f).

In said second embodiment of step f), the kneading step is preferably performed without the addition of an acid or base. Therefore, no acidification or neutralization step of the dried paste is performed at forming step e) via knead-extrusion according to the invention.

The paste is then advantageously passed through a die using a piston for example or a twin-screw or single-screw extruder. The diameter of the extruder die is advantageously variable and is between 0.5 and 5 mm, preferably between 0.5 and 3 mm and more preferably between 0.5 and 2 mm. The shape of the die and therefore the shape of the material obtained in extrudate form is advantageously cylindrical e.g. of circular, trilobate, quadrilobate or multilobate cross-section.

Said organic binder(s) that can be used at said forming step d) are advantageously selected from among paraffins and polymers, alone or in a mixture.

Preferably, said organic binder(s) are selected from among polyvinylpyrrolidone (PVP), polyvinyl alcohol (PVA), an aqueous dispersion of a mixture of paraffin waxes and polyethylene e.g. Cerfobol R75, polysaccharides, methylcellulose, hydroxypropylmethylcellulose, hydroxyethylcellulose and carboxymethylcellulose, taken alone or in a mixture, preferably from among polyvinylpyrrolidone (PVP), polyvinyl alcohol (PVA) and an aqueous dispersion of paraffin waxes and polyethylene e.g. Cerfobol R75, and more preferably from among polyvinylpyrrolidone (PVP) and polyvinyl alcohol (PVA).

One most preferred organic binder is polyvinylpyrrolidone (PVP).

Cerfobol R75 comprises 28.4% by weight of dry organic paraffin diluted in an aqueous phase.

Preferably, said inorganic binder(s) used at said forming step e) are advantageously selected from among silica binders, clay-type binders and inorganic binders able to be generated under the conditions of step e) through the addition of precursors of inorganic binders.

Preferably, said inorganic binder(s) used at said forming step e) are advantageously selected from among silica binders.

Preferably, the silica binders are advantageously selected from among precipitation silica and silica derived from by-products such as fly ash e.g. silico-aluminous or silico-calcic particles, silicic acid, sodium metasilicate and silica fume. Colloidal silica e.g. in the form of a stabilized suspension e.g. the commercial products Ludox® or Klebosol® can also be used.

Preferably, the silica binder is in amorphous or crystalline form. Most preferably, the silica is used in powder form or in colloidal form.

The proportion of said organic or inorganic binder(s) added at aid forming step d) is advantageously between 0.5 and 20% by weight, preferably between 0.5 and 15% by weight, more preferably between 1 and 13% by weight, relative to the total weight of the dried paste to be given form.

The addition of at least one inorganic or organic binder at said step e) facilitates forming via extrusion.

The addition of at least one inorganic or organic binder at said step e) also allows a solid crystalline material to be obtained that is formed preferably in extrudate form having improved resistance under agitation when in contact with brine.

In the event that said step e) is implemented by knead-extrusion in the presence of at least one binder selected from among the inorganic binders likely to be generated under the conditions of said step e), said forming step e) of the dried paste is advantageously performed in the presence of a binder formulation comprising and preferably composed of at least one solid alumina precursor and at least one acid in solution in proportions such that the acid/Al molar ratio is between 0.01 and 1.2.

The addition at the forming step f) of a solid alumina precursor and of an acid in solution allows in-situ generation of a mineral binder resulting from the reaction of the alumina precursor with the acid added at said forming step.

Also, the solid alumina precursor and acid in solution must be added at said step f) in the proportions such as described.

The generation of said mineral binder resulting from the reaction of the solid alumina precursor and added acid requires the use of a solid alumina precursor capable of mostly dispersing or mostly dissolving in the acid solution employed.

The solid alumina precursor is advantageously selected from among aluminium oxides, aluminium hydroxides, aluminium oxyhydroxides and any of the mixtures thereof, soluble or dispersible in the phosphoric acid solution, preferably from among aluminium hydroxides, aluminium hydroxides and any of the mixtures thereof. More preferably, said solid alumina precursor is an aluminium oxyhydroxide and most preferably said solid alumina precursor is boehmite or pseudo-boehmite.

Said solid alumina precursor is advantageously in the form of a powder composed of solid particles having a median diameter determined by Mastersizer laser diffraction particle size measurement by Malvern, of between 9 and 80 µm, preferably between 10 and 60 µm and more preferably between 15 and 45 µm. The particles of the solid alumina precursor are advantageously composed of agglomerates of elementary units, called crystallites, advantageously having a size of between 2 and 150 nm, preferably between 4 and 150 nm and more preferably between 4 and 100 nm determined by transmission electron microscopy (TEM). The morphology of the crystallites, the size and manner in which the crystallites are ordered is chiefly dependent on the synthesis route of the alumina precursor used to prepare said micrometric particles.

Preferably, the proportion of solid alumina precursor added at step f) is between 0.5 and 50 by weight relative to the weight of the dry paste to be given form, preferably between 2 and 30% by weight, and more preferably between 3 and 25% by weight.

In this embodiment, at least one acid in solution is added to the mixture.

Preferably, the acid is selected from among phosphoric acid, hydrochloric acid, nitric acid, acetic acid and citric acid, alone or in a mixture. Most preferably the acid is phosphoric acid. Phosphoric acid is also called orthophosphoric acid.

The role of the acid solution is to promote the formation of a mineral binder amorphous phase resulting from the reaction with the solid alumina precursor. In this manner, the particles of solid alumina precursor, with the action of the acid and mechanical energy provided at the forming step f), become a mineral binder amorphous phase.

Preferably, the acid or acids in solution are added in proportions such that the acid/Al molar ratio is between 0.01 and 1.2, and preferably between 0.03 and 1.

If the added acid is phosphoric acid, it is added in solution in proportions such that the P/Al molar ratio is between 0.01 and 1.2, preferably between 0.3 and 1.0.

In the P/Al molar ratio, P derives from the added phosphoric acid and Al derives from the solid alumina precursor.

The specific P/Al molar ratio of the invention corresponds to a proportion of phosphoric acid such that the ratio of the weight of added acid to the weight of added solid alumina precursor is between 30 and 225% by weight, preferably between 59 and 170% by weight and more preferably.

The use of an acid/Al molar ratio of between 0.01 and 1.2, characteristic of dissolution with high acid ratio, at forming step d) not only allows forming of the amorphous phase of mineral binder resulting from reaction with the solid alumina precursor, but also further facilitates forming via extrusion and increases the cohesion and mechanical strength of the extrudates obtained according to this embodiment.

According to a third embodiment of step f), said forming step f) can advantageously be performed via basic knead-extrusion whereby said dried paste derived from step e) is kneaded in the presence of a base in an amount of between 0.5 and 3% by weight relative to the dry matter, the dry matter being the weight of said paste derived from step e), preferably dried in an oven at 200° C. and preferably for 6 h, said base being selected from among inorganic bases and organic bases in solution, and said paste is then subjected to an extrusion step.

Preferably, said dried paste is kneaded in the presence of an amount of base of between 0.5 and 2.5% by weight relative to the dry matter, the dry matter being the weight of said paste derived from step e) dried preferably in an oven at 200° C. and preferably for 6 h. If the amount of added base is higher than 3% by weight, the adsorption performance of the solid is largely degraded.

Preferably, the inorganic bases are selected from among sodium hydroxide, potassium hydroxide, ammonia and any of the mixtures thereof, and the organic bases in solution are selected from among amines, quaternary ammonium compounds and any of the mixtures thereof. Preferably, the organic bases in solution are selected from among alkyl-ethanol amines, ethoxylated alkyl-amines and any of the mixtures thereof. The organic bases are preferably in solution in water.

More preferably, said base is ammonia and preferably ammonia in an aqueous solution ($NH_4OH$).

Preferably, no acid is added at the forming step f) via knead-extrusion.

If said forming step f) via knead-extrusion, and in particular said knead step is performed in the presence of a binder, said binder is advantageously selected from among organic or inorganic binders such as described above.

Conforming to the invention, the formed material and preferably the extrudates obtained after step d) are subjected to a drying step g) at a temperature of between 20 and 200° C. preferably for a time of between 1 hour and 20 hours, to obtain the solid crystalline material of formula $(LiCl)_x.2Al(OH)_3.nH_2O$ that has been formed preferably in the form of extrudates.

Preferably, said drying step g) is implemented at a temperature of between 20 and 100° C., more preferably between 20 and 80° C., and further preferably between 20 and 60° C., preferably for a time of between 1 and 18 hours, more preferably between 5 and 14 hours, and further preferably between 8 and 14 hours.

The specific conditions of said drying step e) allow a solid crystalline material to be obtained having the desired $(LiCl)_x.2Al(OH)_3.nH_2O$ phase.

Said drying step g) is advantageously performed using techniques known to those skilled in the art and preferably in a drying or heating oven.

Preferably the dried formed material, and preferably the extrudates obtained after step g) can optionally be subjected to a hydrothermal treatment step at a temperature of between 50 and 200° C. and preferably for a time of between 30 min and 12 hours.

Preferably, said step h) is implemented at a temperature of between 70 and 200° C., more preferably between 70 and 180° C., further preferably between 80 and 150° C., e.g. for a time of between 30 minutes and 120 hours.

Said hydrothermal treatment step h) is advantageously carried out using a technique known to persons skilled in the art.

According to one preferred embodiment, said step h) is performed in an autoclave under autogenous pressure and in a water-saturated atmosphere. Preferably, said step h) is performed by placing a liquid at the bottom of the autoclave, said liquid being selected from among water alone or in a mixture with at least one acid, one base or a lithium salt. Preferably, the formed, dried material and preferably the extrudates obtained after step g) are not in contact with the liquid at the bottom of the autoclave.

If water is placed in the autoclave in a mixture with an acid, the acid is advantageously selected from among nitric acid, hydrochloric acid, sulfuric acid and carboxylic acid.

If water is placed in the autoclave in a mixture with a base, the base is advantageously selected from among lithium hydroxide, sodium hydroxide, potassium hydroxide, ammonia and any of the mixtures thereof.

If water is placed in the autoclave in a mixture with a lithium salt, the lithium salt is advantageously selected from among lithium chloride, lithium carbonate and any of the mixtures thereof.

Preferably, said step h) is implemented in the presence of a humid atmosphere having a water content of between 5 and 50 weight %, and preferably between 5 and 45 more preferably between 5 and 40%.

According to one embodiment, said step h) can be performed in a climate chamber, in the presence of a stream of humid air containing between 5 and 50% water, preferably between 5 and 45 weight % and more preferably between 4 and 40 weight % water, or in an oven operating under a stream of humid air containing between 5 and 50 weight % water, preferably between 5 and 45 weight % and more preferably between 5 and 40 weight water, using methods known to persons skilled in the art.

The hydrothermal treatment step h) under a controlled atmosphere allows a solid crystalline material to be obtained of formula $(LiCl)_x.2Al(OH)_3.nH_2O$ with n being between 0.01 and 10, x being between 0.4 and 1, formed preferably in the form of extrudates having good resistance and good mechanical strength when placed in contact with brine or a diluted solution and preferably in water.

After said step h), the material obtained preferably formed in the form of extrudates is advantageously recovered and optionally washed.

Said formed material and preferably the extrudates obtained after step h) can optionally be subjected to a drying step i), said drying step preferably being conducted at a temperature of between 15 and 50° C. preferably for a time of between 1 h and 12 hours to obtain the formed, solid crystalline material of formula $(LiCl)_x.2Al(OH)_3.nH_2O$ with n being between 0.01 and 10, x being between 0.4 and 1.

Said drying step i) is advantageously performed using techniques known to those skilled in the art and preferably in a drying or heating oven.

With the process of the present invention it is therefore possible to obtain a solid crystalline material of formula $(LiCl)_x.2Al(OH)_3.nH_2O$ with n being between 0.01 and 10, x being between 0.4 et 1, preferably in the form of extrudates having a cross-section (largest dimension of the cross-section) or diameter of between 0.2 and 5 mm, preferably between 0.3 and 4 mm, more preferably between 0.3 and 3 mm, further preferably between 0.3 and 2 mm, most preferably between 0.3 and 1.8 mm.

The best results in terms of mechanical strength and cohesion of the solid crystalline material, obtained with the preparation process of the invention, are obtained with extrudates having a cross-section (largest dimension of the cross-section) or diameter of between 0.2 and 5 mm and preferably between 0.3 and 1.8 mm, said extrudates able to be obtained by means of a combination of a specific forming step such as described above and a final drying step i) conducted at a temperature of between 20 and 200° C., preferably between 20 and 60° C. and in particular at 40° C., preferably for a time of between 1 and 20 hours, preferably between 5 and 14 hours, preferably between 8 and 14 hours and in particular for 8 hours.

The solid crystalline material of formula $(LiCl)_x.2Al(OH)_3.nH_2O$, formed preferably in extrudate form, able to be prepared in accordance with the sequence of steps a) to i) of the preparation process of the invention, can be characterized with the following techniques: nitrogen adsorption to determine specific surface area as per the BET method; X-ray diffractometry in the diffraction angle domain of $2\Theta=0.8$ to $40°\pm0.02°$ in reflection geometry to identify the structure of said material, and elementary analysis.

The solid crystalline material of formula $(LiCl)_x.2Al(OH)_3,nH_2O$, formed preferably in extrudate form, advantageously has a specific surface area measured with the BET method of between 1 and 30 m²/g and preferably between 1 and 20 m²/g.

The X-ray diffraction diagram of the material in extrudate form corresponds to a crystalline solid of formula $(LiCl)_x.2Al(OH)_3,nH_2O$ with x=1 according to JCPDS datasheet No 0031-07-00, with n being between 0.01 and 10, preferably between 0.1 and 0.5, more preferably between 0.1 and 5 and further preferably between 0.1 and 1, advantageously formed in extrudate form.

The preparation process of the present invention therefore allows a solid crystalline material to be obtained of formula $(LiCl)_x.2Al(OH)_3,nH_2O$, n and x having the aforementioned definition, preferably formed in extrudate form, having a small BET specific surface area, good cohesion with no apparent defect, and having good resistance and good mechanical strength when placed in contact with brine or a diluted solution and preferably in water.

The good properties of the material obtained result from the combined effect of forming preferably via extrusion of a paste, in the absence of a binder, directly after a drying step carried out under specific conditions, from the implementing of a drying step after the forming step, also carried out under specific conditions, and preferably from the implementing of a final hydrothermal treatment step preferably performed in an autoclave.

In addition, the solid crystalline material, formed preferably in extrudate form, thus obtained of formula $(LiCl)_x.2Al(OH)_3,nH_2O$ with n and x having the aforementioned definition, has improved lithium adsorption capacity and improved adsorption kinetics compared to prior art materials when it is used in a process to extract lithium from saline solutions.

The materials obtained with the invention have an improved adsorption capacity compared to prior art materials that is higher than 6 mg Li/g dry solid material i.e. the solid material dried at 200° C., preferably of between 6 and 10 mg Li/g, more preferably between 6 and 8 and further preferably between 6 and 7 mg Li/g dry solid material.

A further subject of the present invention is a process for extracting lithium from a saline solution using said solid crystalline material of formula $(LiCl)_x.2Al(OH)_3,nH_2O$ with n being between 0.01 and 10, x being between 0.4 and 1, prepared according to the invention.

Said saline solution used in the extraction process of the invention advantageously has a lithium concentration of between 0.001 mol/L and 0.5 mol/L, preferably between 0.02 mol/L and 0.3 mol/L.

Said saline solution also contains one or more species such as the species selected from the following list: Na, K, Rb, Cs, Mg, Ca, Sr, Ba, F, Cl, Br, I, $SO_4$, $CO_3$, $NO_3$, and $HCO_3$. Advantageously, said saline solution may or may not be saturated with salts.

Said saline solution can be any natural saline solution, concentrated or derived from a lithium extraction or conversion process. For example, said saline solution used in the extraction process of the invention can advantageously be selected from among brine from salt lakes or geothermal sources, brine subjected to evaporation to obtain lithium-concentrated brine, seawater, effluent from cathode production plants or from lithium chloride or hydroxide production plants, and effluent from lithium ore-extraction processes.

The lithium extraction process of the invention is preferably a lithium-selective extraction process. It allows the separation of lithium from alkali metals, preferably sodium (Na) and potassium (K), and from alkaline-earth metals preferably (Mg), calcium (Ca) and strontium (Sr), contained in massive quantities in the treated saline solutions in said extraction process.

The lithium extraction process of the invention also allows selective separation of lithium from other compounds such as boron and sulfates.

The lithium extraction process of the invention is advantageously implemented in a unit comprising at least one column, said column(s) comprising at least one bed of said solid crystalline material of formula $(LiCl)_x.2Al(OH)_3,nH_2O$, with n and x having the aforementioned definition, prepared and formed with the preparation process of the invention.

Preferably, said lithium extraction process of the invention is implemented in a unit comprising at least two columns, and preferably between two and three columns, comprising at least one bed of solid crystalline material of formula $(LiCl)_x.2Al(OH)_3,nH_2O$, with n and x having the aforementioned definition.

Said lithium extraction process advantageously comprises at least the following steps:
  an activation step of said solid crystalline material of formula $(LiCl)_x.2Al(OH)_3,nH_2O$, with n and x having the aforementioned definition,
  a loading step of said material activated by adsorption, performed by passing said saline solution over said activated material,
  optionally, at least one wash step of the saline solution impregnating said material by passing a wash solution over said material,
  a lithium desorption step performed by passing water or an aqueous solution of lithium salt over said material to obtain an eluate at least comprising lithium.

Preferably, the lithium extraction process of the invention comprises a prior step to place said material in a column.

Preferably, said extraction process comprises an optional wash step of the saline solution impregnating said material, by passing a wash solution over said material, said wash step preferably being conducted between the loading step and the desorption step.

Preferably, said activation step of the solid crystalline material of formula $(LiCl)_x.2Al(OH)_3,nH_2O$, with n and x having the aforementioned definition, preferably formed in extrudate form, is carried out at a single time when the synthesized material formed according to the preparation process of the invention is placed in the column.

Said activation step allows the activation of sites intended for selective adsorption of lithium.

Preferably, said activation step is advantageously performed by upflow or downflow passing of an activation solution selected from among water and a solution of lithium salt having a concentration of between 0.001 mol/L and 0.1 mol/L, preferably between 0.001 mol/L and 0.05 mol/L, and more preferably between 0.01 and 0.04 mol/L.

Preferably, the lithium salt used in solution at said activation step is selected from among lithium chloride (LiCl), lithium nitrate and lithium bromide.

More preferably, the lithium salt used in solution at said activation step is lithium chloride (LiCl).

Said activation step is advantageously conducted at a temperature of between 0° C. and 90° C., preferably between 10° C. and 60° C., more preferably at between 10° C. and 30° C., with a residence time of said activation solution in the column preferably of between 0.03 and 10 h, preferably between 0.06 and 1 h.

The quantity of solution required for activation is advantageously between 1 and 30 bed volumes, preferably between 2 and 20 bed volumes.

«Bed Volume» is the volume occupied by the bed of solid in a column and abbreviated to BV in the technical field known to persons killed in the art.

Said solid crystalline material can optionally undergo a wash step prior to the activation step, with a wash solution that is preferably a solution of lithium chloride (LiCl) or a mixture of lithium chloride (LiCl) and sodium chloride (NaCl).

Said loading step of said material activated by adsorption is advantageously performed by passing the saline solution treated in the extraction process of the invention over said activated material.

Said loading step is advantageously conducted at a temperature of between 0° C. and 90° C., preferably between 10° C. and 70° C. with a residence time of said solution, preferably of said treated saline solution in the column of preferably between 0.03 and 10 h, and preferably between 0.06 and 1 h 30 minutes.

The quantity of solution required to saturate said material is dependent on the adsorption capacity of said material and the lithium concentration of the saline solution.

The adsorption capacity of the materials of the invention is higher than 6 mg Li/g dry solid material, preferably between 6 and 10 mg Li/g, more preferably between 6 and 8 and further preferably between 6 and 7 mg Li/g dry solid material.

If said lithium extraction process of the invention is implemented in a unit comprising two columns, the first column is advantageously saturated with lithium at said loading step. The second column, receiving the flow at the outlet of the first column, is advantageously loaded until lithium leakage is obtained not exceeding 10% of the concentration of the entering lithium flow, and preferably 5%, thereby allowing maximisation of the lithium recovery yield.

If said lithium extraction process of the invention is implemented in a unit comprising three columns, the third column already saturated with lithium is dedicated to the lithium wash and desorption steps described below, during the loading of the two other columns.

The first fraction of the outgoing flow at said loading step via adsorption, advantageously between 0 and 1 bed volumes, corresponds to the removal of the impregnating solution derived from the activation step of the solid material. This fraction can be considered to be an effluent or can be recycled, preferably recycled as entering flow for the desorption step. If it is natural brine or seawater that is processed, over and above 1 bed volume, the entirety of the outgoing flow at said loading step via adsorption, called raffinate below, which has not undergone any chemical treatment is advantageously and preferably returned towards the original deposit of saline solution.

After the loading step by passing the saline solution treated in the process of the invention over the activated material, the saline solution impregnates said activated material.

The saline solution impregnating the activated material is optionally washed in at least one wash step by passing a wash solution over said material.

Said wash step(s) of the saline solution impregnating said material are advantageously performed by upflow or downflow passing of a wash solution over said material, preferably downflow.

Preferably, said wash solution is selected from among water and an aqueous solution of a sodium salt preferably sodium chloride (NaCl), optionally comprising a lithium salt preferably lithium chloride (LiCl), said solution advantageously having a sodium salt and preferably sodium chloride (NaCl) concentration higher than 0.5 mol/L, preferably between 1 mol/L and saturation, and a lithium salt concentration preferably lithium chloride (LiCl) of between 0 mol/L and 2 mol/L.

According to one preferred embodiment, said saline solution impregnating the activated material undergoes a final wash step by passing an aqueous wash solution of sodium chloride (NaCl) optionally comprising lithium chloride (LiCl), over said material.

Said wash step is advantageously performed at a temperature between 0° C. and 90° C., preferably between 10° C. and 70° C., and preferably with a residence time of said solution, preferably said wash solution in the column of between 0.03 and 10 h, and preferably between 0.06 and 1 h. The quantity of solution required for washing is generally between 0.1 and 10 bed volumes, and preferably over the range 0.5 to 5 bed volumes.

The outgoing flow from said wash step is considered as effluent or it is advantageously recycled, preferably recycled at the inlet of the loading step or directly at the inlet of the second column if said lithium extraction process of the invention is implemented in a unit comprising at least two columns.

Said wash step allows washing of the saline solution impregnated in said material at the loading step of said material via adsorption, whilst limiting lithium desorption.

If said wash solution is a concentrated aqueous solution of sodium chloride (NaCl), said wash step not only allows removal of the saline solution impregnated in said material at the loading step of said material via adsorption, but also allows desorbing of elements such as boron, sulfates, alkali metals other than lithium and sodium, and alkaline-earth metals.

The lithium desorption step is performed by passing water or an aqueous solution of lithium chloride (LiCl) over said material after the wash step to obtain an eluate at least containing lithium.

Preferably, said desorption step is performed by upflow or downflow, preferably downflow, passing of a desorption solution selected from among water and a lithium chloride solution (LiCl) containing 0.001 mol/L to 2 mol/L LiCl, preferably from 0.01 mol/L to 1 mol/L.

Said desorption step is advantageously conducted at a temperature of between 0° C. and 90° C., preferably between 10° C. and 70° C., preferably with a residence time of said desorption solution in the column of between 0.03 and 10 h, preferably between 0.06 and 1 h.

The quantity of lithium chloride solution (LiCl) required for desorption is advantageously between 0.01 and 10 bed volumes, and preferably between 0.05 and 5 bed volumes.

The outgoing flow at said lithium desorption step generates the final product of the process, called eluate.

The eluate is advantageously recovered at between 0 and 4 bed volumes, preferably between 0.2 and 3 bed volumes.

Since all the other fractions of the outgoing flow at this step do not form the final product called eluate, they are considered as effluent or are advantageously recycled, and preferably recycled at the inlet to the loading, wash or elution step.

The eluate obtained after the extraction process of the invention is a solution mostly containing the elements Li, Na and Cl, and impurities preferably from among K, Mg, Ca, Sr, B or $SO_4$.

The eluate is advantageously concentrated and purified to obtain a lithium salt of high purity.

Said lithium extraction process of the invention allows the selective extraction of lithium from a saline solution and thereby allows a high purification factor to be obtained compared to the initial saline solution, calculated as being the ratio X/Li which is equal to the molar ratio of X/Li concentration in the initial saline solution divided by the molar ratio of X/Li concentration in the eluate, X being selected from among sodium (Na), potassium (K), magnesium (Mg), calcium (Ca), boron (B), sulfur (S) and strontium (Sr).

The present invention also covers a lithium extraction device, characterized in that it comprises a unit comprising at least one column, said column comprising at least one packing comprising the solid crystalline material of formula $(LiCl)_x \cdot 2Al(OH)_3 \cdot nH_2O$, with n and x having the aforementioned definition.

More particularly, the invention convers a device implementing the lithium extraction process of the invention. More specifically, the device of the present invention comprises units or means implementing the different steps of the lithium extraction process of the invention.

By «of the invention» or equivalent terms it is meant to cover any embodiment, variant, advantageous or preferred characteristic taken alone or in any combination, without any limitation.

The invention is illustrated by the following examples which are in no way limiting.

EXAMPLES

Example 1: (of the Invention)

A solid material was prepared of formula $(LiCl)_x \cdot 2Al(OH)_3 \cdot nH_2O$ with n being between 0.01 and 1 and x=0.6, with a synthesis process conforming to the invention, wherein the contacting step c) was performed with a Li/Al ratio of 0.5, and the forming step was carried out via direct extrusion without a binder.

1/Precipitation of Boehmite AlOOH

In a beaker cooled over an ice bath, a solution was prepared containing 326 ml of deionized water and 135.6 g of aluminium chloride hexahydrate $(AlCl_3 \cdot 6H_2O)$. Under magnetic stirring 67.5 g of sodium hydroxide (NaOH) were added over 30 minutes to adjust the pH. The pH reached on completion of synthesis was 8. The temperature was held at 20° C. throughout the entire duration of the precipitation step. This cake was placed in suspension in a 3 L beaker with 320 mL of water.

Figure 1:
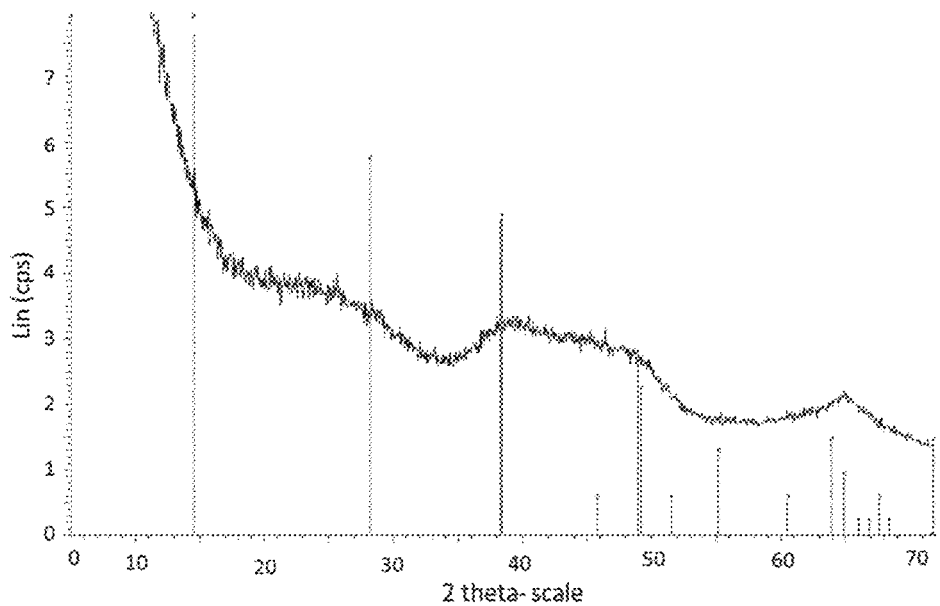
FIGS. 1 and 3 give X-ray diffraction diagrams of the precipitated boehmites obtained in Examples 1 to 3 for FIG. 1 and in Example 4 for FIG. 3 respectively.

A sample of the precipitate obtained was taken from the reaction medium. The XRD (FIG. 1) of the precipitate shows that the precipitate obtained in Example 1 is indeed a boehmite precipitate. The boehmite precipitate obtained in Example 1 is scarcely crystallized. The size of the crystallites of the boehmite obtained was measured using the Scherrer method:

Size along [020]=0.6±0.1 (nm); Size along [120]=1.4±0.1 (nm)

2/Addition of Lithium Chloride LiCl.

A solution was prepared containing 11.9 g of lithium chloride LiCl supplied by Prolabo, corresponding to a Li/Al molar ratio of 0.5, with 1326 ml of water, and added to the repulped cake of preceding step 1. This reaction medium was left under agitation and heated to 80° C. for 2 h.

Filtering and drying in an oven, at 80° C. for 8 h, followed after the first 2 steps.

The solid material thus prepared was characterized by the formula $(LiCl)_x \cdot 2Al(OH)_3 \cdot nH_2O$ with n=0.25 and x=0.6, using a synthesis process conforming to the invention. The forming step of the paste obtained was carried out directly after the drying step with no prior kneading step and no binder. The paste obtained was formed using a piston extruder (MTS) fitted with a cylindrical die 1 mm in diameter.

The extrudates were dried in an oven at 40° C. for 12 h.

The extrudates obtained were subjected to a hydrothermal treatment step in an autoclave containing water. 10 g of extrudates were placed in a basket positioned in a 500 ml autoclave. 20 g of distilled water were placed in the bottom of the autoclave. The extrudates were not in contact with the liquid at the bottom of the autoclave.

Hydrothermal treatment was conducted at a temperature of 100° C. for 6 h in a water-saturated atmosphere.

Figure 2:
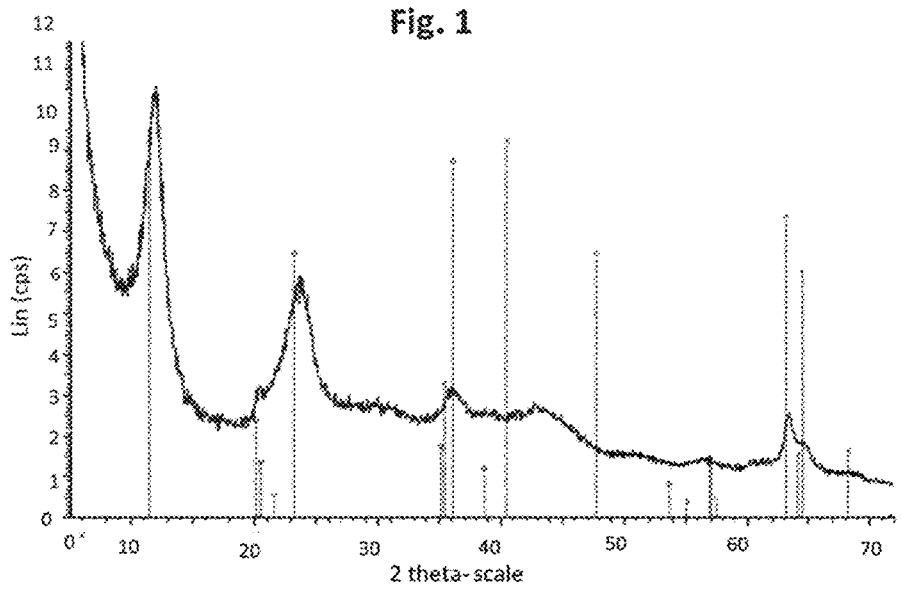
FIGS. 2 and 4 give X-ray diffraction diagrams of the solid materials obtained in the form of extrudates in Examples 1 to 3 for FIG. 2 and in Example 4 for FIG. 4 respectively.

The extrudates of the solid material obtained showed good cohesion and were of good appearance. According to the X-ray diffractogram a $LiCl \cdot 2Al(OH)_3 \cdot nH_2O$ phase was detected (FIG. 2).

The extrudates obtained were also characterized by the following measurements:

Elementary analysis showed good Li/Al/Cl stoichiometry corresponding to the composition of a $(LiCl)_{0.6} \cdot 2Al(OH)_3 \cdot nH_2O$ structure.

Al=24.8 weight %; Li=1.9 weight %; Cl=9.8 weight %.

The extrudates obtained had a specific surface area of: $S_{BET}=3$ m$^2$/g.

The extrudates obtained in Example 1 visually exhibited good cohesion, had few or no cracks and showed very good cohesion and very good mechanical strength when placed in contact with brine (percent destruction less than 15% at the cohesion test) or water (percent destruction less than 20% at the cohesion test).

Example 2: (of the Invention)

A solid material was prepared of formula $(LiCl)x \cdot 2Al(OH)_3 \cdot nH_2O$ with n being between 0.01 and 1 and x=0.6, with the synthesis process conforming to the invention, wherein the contacting step was conducted with a Li/Al molar ratio of 0.5 and the forming step carried out by basic knead-extrusion.

1/Precipitation of Boehmite AlOOH

In a beaker cooled over an ice bath, a solution was prepared containing 326 ml of deionized water and 135.6 g of aluminium chloride hexahydrate ($AlCl_3$). Under magnetic stirring, 67.5 g of sodium hydroxide (NaOH) were added over 30 minutes to adjust the pH. The pH reached on completion of synthesis was 8. The temperature was held at 20° C. throughout the duration of the precipitation step. The suspension obtained was filtered and washed with water. The cake was placed in suspension in a 3 L beaker with 320 mL of water.

A sample of the precipitate obtained was taken from the reaction medium. The XRD of the precipitate was identical to the XRD obtained in Example 1 (cf. FIG. 1) showing that the precipitate obtained in Example 2 was indeed a boehmite precipitate. The boehmite precipitate obtained in Example 2 was scarcely crystallized.

The size of the crystallites of the boehmite obtained was measured using the Scherrer method:

Size along [020]=0.6±0.1 (nm); Size along [120]=1.4±0.1 (nm)

2/Addition of Lithium Chloride LiCl.

A solution was prepared containing 11.9 g of lithium chloride LiCl supplied by Prolabo, corresponding to a Li/Al ratio of 0.5, with 1326 ml of water, and added to the repulped cake of preceding step 1. This reaction medium was left under agitation and heated to 80° C. for 2 h.

Filtering then drying in an oven, at 80° C. for 8 h, followed after the first 2 steps.

3/Knead-Extrusion

The forming step was carried out by kneading then extrusion. For the kneading step, 35.5 g of the paste obtained above were placed in a kneader of Brabender type (80 ml capacity) with 1.39 g of 20.18 weight % ammonia solution, corresponding to 1% by weight of base ($NH_4OH$) relative to the dry matter, the dry matter being the weight of said paste after the previous drying, dried in an oven at 200° C. for 6 h. The ammonia solution was mixed with 16 g of demineralized water and added over 2 minutes under kneading at 50 rpm. Additional water of about 2.7 g was added to obtain a homogeneous, extrudable, cohesive paste. Kneading was continued at the same speed for 30 minutes after completion of the addition of ammonia and water.

The paste obtained was formed using a piston extruder (MTS) fitted with a cylindrical die 1 mm in diameter.

The extrudates obtained were subjected to a hydrothermal treatment step in an autoclave containing water. 10 g of extrudates were placed in a basket positioned in a 500 ml autoclave. 20 g of distilled water were placed in the bottom of the autoclave. The extrudates were not in contact with the liquid at the bottom of the autoclave.

Hydrothermal treatment was carried out at a temperature of 100° C. for 6 h in a water-saturated atmosphere.

The extrudates of the solid material obtained in Example 2 showed good cohesion and good appearance. The X-ray diffractogram detected a $LiCl.2Al(OH)_3,nH_2O$ phase (FIG. 2).

The XRD of the final material was identical to the XRD of the material obtained in Example 1 (cf. FIG. 2).

The extrudates obtained were also characterized by the following measurements:

Elementary analysis showed good Li/Al/Cl stoichiometry corresponding to the composition of a $(LiCl)_{0.6}.2Al(OH)_3, nH_2O$ structure.

Al=24.8 weight %; Li=1.9 weight %; Cl=9.8 weight %.

The extrudates obtained had a specific surface of: $S_{BET}$=3 $m^2/g$.

The extrudates obtained in Example 2 visually displayed good cohesion, had few or no cracks and showed very good cohesion and very good mechanical strength when placed in contact with brine (percent destruction less than 15% at the cohesion test) or water (percent destruction less than 20% at the cohesion test).

Example 3: (Comparative)

A solid material was prepared of formula $(LiCl)_x.2Al(OH)_3,nH_2O$ with n between 0.01 and 1 and x=1, with a synthesis process not conforming to the invention in that the contacting step c) was performed with a Li/Al ratio of 3.3. The forming step was implemented by basic knead-extrusion.

1/Precipitation of Boehmite AlOOH

In a beaker cooled over an ice bath, a solution was prepared containing 326 ml of deionized water and 135.6 g of aluminium chloride hexahydrate ($AlCl_3$). Under magnetic stirring, 67.5 g of sodium hydroxide (NaOH) were added over 30 minutes to adjust the pH. The pH reached on completion of synthesis was 8. The temperature was held at 20° C. throughout the entire duration of the precipitation step. The suspension obtained was filtered and washed with water. The cake was placed in suspension in a 3 L beaker with 320 mL of water.

A sample of the precipitate obtained was taken from the reaction medium. The XRD of the precipitate was identical to the XRD obtained in Example 1 (cf. FIG. 1) and showed that the precipitate obtained in Example 3 was indeed a precipitate of boehmite. The boehmite precipitate obtained in Example 3 was scarcely crystallized.

The size of the crystallites of the boehmite obtained was measured with the Scherrer method:

Size along [020]=0.6±0.1 (nm); Size along [120]=1.4±0.1 (nm)

2/Addition of Lithium Chloride LiCl.

A solution was prepared containing 78.5 g of lithium chloride LiCl supplied by Prolabo, corresponding to a Li/Al ratio of 3.3, and 1326 ml of water, and was added to the repulped cake of preceding step 1. This reaction medium was left under agitation and heated to 80° C. for 2 h.

Filtration then drying in an oven, at 80° C. for 8 h, followed after the first 2 steps.

3/Knead-Extrusion

The forming step was implemented by kneading then extrusion. For the kneading step, 35.5 g of the paste obtained above were placed in a kneader of Brabender type (80 ml capacity) with 1.39 g of 20.18 weight % ammonia solution corresponding to 1% by weight of base ($NH_4OH$) relative to the dry matter, the dry matter being the weight of said paste after the previous drying, dried in an oven at 200° C. for 6 h. The ammonia solution was mixed with 16 g of demineralized water and added over 2 minutes under kneading at 50 rpm. Additional water of about 2.7 g was added to obtain a homogenous, extrudable, cohesive paste. Kneading was continued at the same speed for 30 minutes after completion of the addition of ammonia and water.

The paste obtained was formed using a piston extruder (MTS), fitted with a cylindrical die 1 mm in diameter.

The extrudates obtained were subjected to hydrothermal treatment in an autoclave containing water. 10 g of extrudates were placed in a basket positioned in a 500 ml autoclave. 20 g of distilled water were placed in the bottom of the autoclave. The extrudates were not in contact with the liquid at the bottom of the autoclave.

Hydrothermal treatment was conducted at a temperature of 100° C. for 6 h in a water-saturated atmosphere.

Extrudates of the solid material of formula $(LiCl)_x.2Al(OH)_3,nH_2O$ with n=0.25 and x=1 showing good cohesion and good appearance were obtained. A LiCl.2Al(OH)$_3$, nH$_2$O phase was detected in the X-ray diffractogram of the extrudates of solid material of formula (LiCl)$_x$.2Al(OH)$_3$, nH$_2$O with n=0.25 and x=1 obtained in Example 3. Th XRD of the final material was identical to the XRD of the material obtained in Example 1 (cf. FIG. 2).

The extrudates obtained were also characterized by the following measurements:

Elementary analysis showed good Li/Al/Cl stoichiometry corresponding to the composition of a LiCl.2Al(OH)$_3$,nH$_2$O structure.

Al=23 weight %; Li=3 weight %; Cl=15.1 weight %.

The extrudates obtained had a specific surface area of: S$_{BET}$=3 m$^2$/g.

The extrudates obtained in Example 3 visually exhibited good cohesion, had few or no cracks and showed very good cohesion and very good mechanical strength when placed in contact with brine (percent destruction less than 15% at the cohesion test) or water (percent destruction less than 20% at the cohesion test).

Example 4: Comparative

A solid material was prepared of formula (LiCl)$_x$.2Al(OH)$_3$,nH$_2$O with n being between 0.01 and 1 and x=1 with a synthesis process not conforming to the invention in that the boehmite precipitation step was conducted at pH=10. The contacting step c) was performed with a Li/Al ratio=0.5.

1/Precipitation of Boehmite AlOOH

In a beaker cooled over an ice bath, a solution was prepared containing 326 ml of deionized water and 135.6 g of aluminium chloride hexahydrate (AlCl$_3$). Under magnetic stirring, 67.5 g of sodium hydroxide (NaOH) were added over 30 minutes to adjust the pH. The pH reached on completion of synthesis was 10. The temperature was held at 20° C. throughout the entire duration of the precipitation step. This cake was placed in suspension in a 3 L beaker with 320 mL of water.

Figure 3:
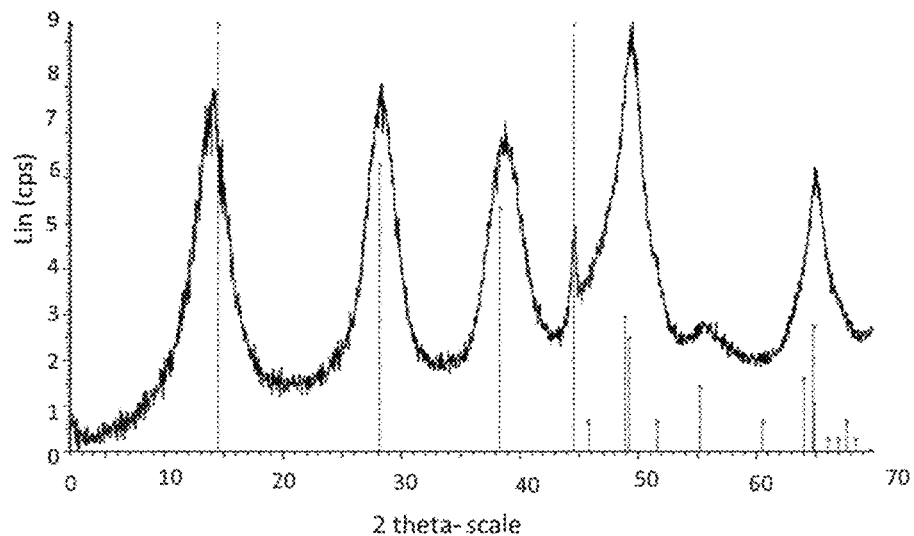

A sample of the precipitate obtained was taken from the reaction medium. The XRD (FIG. 3) of the precipitate showed that the precipitate obtained in Example 4 was indeed a precipitate of boehmite that was extremely well crystallized.

The size of the crystallites of the boehmite obtained was measured with the Scherrer method: Size along [020]=2.1±2 (nm); Size along [120]=2.8±3 (nm)

2/Addition of Lithium Chloride LiCl.

A solution was prepared containing 11.9 g of lithium chloride LiCl supplied by Prolabo, corresponding to a Li/Al ratio of 0.5, with 1326 ml of water, and added to the repulped cake of preceding step 1. This reaction medium was left under agitation and heated to 80° C. for 2 h.

Filtration then drying in an oven, at 80° C. for 8 h, followed after the 2 first steps.

The solid material thus prepared was characterized by the formula (LiCl)$_x$.2Al(OH)$_3$,nH$_2$O with n=0.25 and x=0.6 with a synthesis process conforming to the invention. The forming step of the paste obtained was implemented directly after the drying step, with no prior kneading step and no binder. The paste obtained was formed in a piston extruder (MTS), fitted with a cylindrical die 1 mm in diameter.

The extrudates were prepared as in Example 4 up until the drying step in an oven at 40° C. for 12 h.

The extrudates obtained were subjected to a hydrothermal treatment step in an autoclave containing water. 10 g of extrudates were placed in a basket positioned in a 500 ml autoclave. 20 g of distilled water were placed in the bottom of the autoclave. The extrudates were not in contact with the liquid at the bottom of the autoclave.

The hydrothermal treatment was conducted at a temperature of 100° C. for 6 h in a water-saturated atmosphere.

Figure 4:
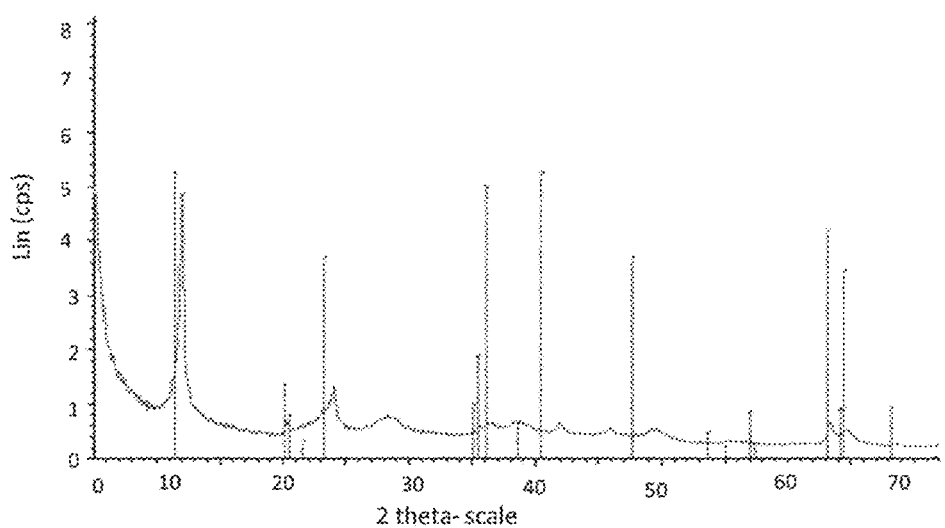

Extrudates of the solid material of formula (LiCl)$_x$.2Al(OH)$_3$,nH$_2$O with n=0.25 and x=0.6 having good cohesion and good appearance were obtained. A (LiCl)$_x$.2Al(OH)$_3$, nH$_2$O phase was detected in the X-ray diffractogram of the extrudates of the solid material of formula (LiCl)$_x$.2Al(OH)$_3$,nH$_2$O with n=0.25 and x=1 obtained in Example 1 (FIG. 4).

The extrudates obtained were also characterized by the following measurements:

Elementary analysis showed good Li/Al/Cl stoichiometry corresponding to the composition of a (LiCl)$_x$.2Al(OH)$_3$, nH$_2$O structure.

Al=24.8 weight %; Li=1.9 weight %; Cl=9.8 weight %.

The extrudates obtained had a specific surface area of: S$_{BET}$=3 m$^2$/g.

The extrudates obtained in Example 4 visually displayed good cohesion, had few or no cracks, and showed very good cohesion and very good mechanical strength when placed in contact with brine (percent destruction less than 15% at the cohesion test) or water (percent destruction less than 20% at the cohesion test).

Example 5: Test on Adsorption Capacity and Adsorption Kinetics

The adsorption kinetics of lithium by the extrudates and their adsorption capacity were tested by determining a breakthrough curve, also called a leak curve or saturation curve, in a column. A saturation curve was determined for each of the solid extrudates obtained in Examples 1 to 4:
- 15 g of solids (extrudates) were placed in a column;
- 10 bed volumes of a saline solution of lithium chloride (LiCl) at 0.02 mol/L was passed through the column in a closed circuit until a stable concentration of lithium in solution was obtained;
- A natural solution containing about 0.06 mol/L of lithium was passed through the column in upflow direction at a flow rate of 6 BV/h, i.e. six times the volume occupied by the bed of extrudates in one hour;
- The lithium concentration was measured at the outlet of the column as a function of the volume of solution that was passed.

Figure 5:
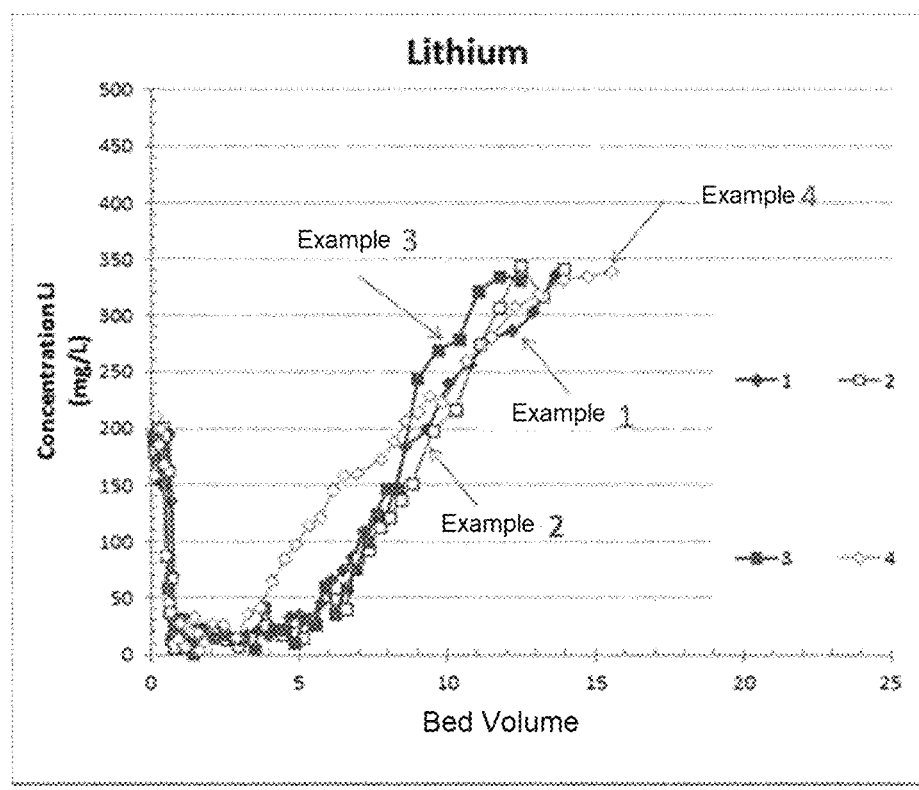
FIG. 5 illustrates the saturation curve of Example 5 determined with extrudates obtained in Examples 1 to 4.

FIG. 5 gives the saturation curves obtained for each of the extrudates obtained in Examples 1 and 2 conforming to the invention, and 3 and 4 not conforming to the invention.

The results obtained are summarized in Table 1.

TABLE 1

| Examples | x | knead | end-precipitation pH | Li added (Li/Al) | Capacity mg(Li)/g(dry solid) |
|---|---|---|---|---|---|
| 1 | 0.6 | direct | 8 | 0.5 | 6.6 |
| 2 | 0.6 | basic | 8 | 0.5 | 6.6 |
| 3 | 1 | basic | 8 | 3.3 | 5.8 |
| 4 | 0.6 | basic | 10 | 0.5 | 4.3 |

The extrudates obtained in Examples 1 and 2 of the invention were compared with those obtained in Examples 3 and 4 for which the preparation processes did not conform to the invention. The extrudates in Examples 1 and 2 obtained with the invention show the onset of lithium leakage at higher volumes of passed brine. Their lithium adsorption capacities are respectively 6.6 and 6.6 mg (Li)/g (dry solid), compared to 5.8 and 4.3 mg (Li)/g (dry solid) respectively for the solids obtained in Examples 3 and 4 using preparation processes not conforming to the invention.

The invention claimed is:

1. A process for preparing a solid crystalline material of formula $(LiCl)_x.2Al(OH)_3.nH_2O$, wherein n is between 0.01 and 10, and x is between 0.4 and 0.6, said process comprising:
   a) precipitating boehmite, in an aqueous medium, comprising the contacting of at least one base precursor with at least one acid precursor, wherein at least one of the base or acid precursors comprises aluminium, to obtain a suspension of boehmite, said precipitating being conducted at a temperature of between 5 and 35° C., and the amount of base precursor being selected so as to obtain an end-precipitation pH of between 7.5 and 9.5 in the reaction medium;
   b) washing and filtering the precipitate of boehmite obtained in a);
   c) placing the precipitate obtained in b) in contact with a quantity of lithium chloride equivalent to a Li/Al molar ratio of between 0.3 and 0.5;
   d) filtering the suspension obtained in c) to obtain a paste;
   e) drying the paste obtained in d) at a temperature of between 20° C. and 80° C.;
   f) shaping said dried paste; and
   g) drying the shaped dried paste obtained in f) at a temperature of between 20° C. and 200° C.

2. The process according to claim 1, wherein the base precursor is sodium hydroxide (NaOH).

3. The process according to claim 1, wherein said precipitating is conducted at a temperature of between 10 and 25° C.

4. The process according to claim 1, wherein the amount of base precursor is selected so as to obtain an end-precipitation pH in the reaction medium of between 7.7 and 8.8.

5. The process according to claim 1, wherein c) is conducted for a time of between 15 minutes and 5 hours.

6. The process according to claim 1, wherein f) is implemented via extrusion.

7. The process according to claim 6, wherein f) is implemented directly after e).

8. The process according to claim 6, wherein f) is implemented via base knead-extrusion wherein said dried paste derived in e) is kneaded in the presence of an amount of base of between 0.5 and 3 weight % relative to the dry matter, the dry matter being the weight of said paste derived from e), said base being selected from the group consisting of inorganic bases and organic bases in solution, and wherein said paste is then subjected to an extrusion.

9. The process according to claim 1, wherein said base precursor is selected from the group consisting of sodium aluminate, potassium aluminate, ammonia, sodium hydroxide, potassium hydroxide, and any mixtures thereof.

10. The process according to claim 1, wherein said acid precursor is selected from the group consisting of aluminium chloride, hydrochloric acid, and any mixtures thereof.

* * * * *